United States Patent [19]

Merola

[11] 4,272,798
[45] Jun. 9, 1981

[54] COMPOSITE GROUNDABLE BARRIER FOR SWITCHGEAR AND GROUNDING APPARATUS

[75] Inventor: Carl R. Merola, Monroeville, Pa.
[73] Assignee: Westinghouse Electric Corp., Pittsburgh, Pa.
[21] Appl. No.: 88,307
[22] Filed: Oct. 25, 1979
[51] Int. Cl.³ .............................................. H02B 1/04
[52] U.S. Cl. .............................. 361/345; 200/50 AA; 361/212; 361/337
[58] Field of Search .................. 200/50 AA, 304, 305; 361/212, 331, 332, 334, 336–339, 343, 345; 174/5 R, 5 S, 5 G

[56] References Cited

U.S. PATENT DOCUMENTS

| | | | |
|---|---|---|---|
| 3,213,222 | 10/1965 | Finley | 200/50 AA |
| 3,920,939 | 11/1975 | Ciboldi | 200/50 AA |
| 4,216,521 | 8/1980 | Merola | 361/345 |

Primary Examiner—Gerald P. Tolin
Attorney, Agent, or Firm—M. J. Moran

[57] ABSTRACT

A grounding arrangement for a shutter for a high voltage metal clad switchgear arrangement is taught. The shutter is a composite of an electrically insulating material such as polyester and islands of electrically conductive material such as non-magnetic aluminum. The polyester material reduces the chance for flash-over between the high voltage conductors and the grounded metal islands or other conductors, while the grounded metal islands provide a region of zero ground potential in an area associated with the openings of the high voltage terminal assemblies to thus assure that personnel who approach this region will always be exposed to ground potential and not high voltage potential. When the shutter is raised, a dual switching arrangement is automatically actuated to disconnect the islands of the shutter from the ground potential of the metal clad switchgear.

16 Claims, 15 Drawing Figures

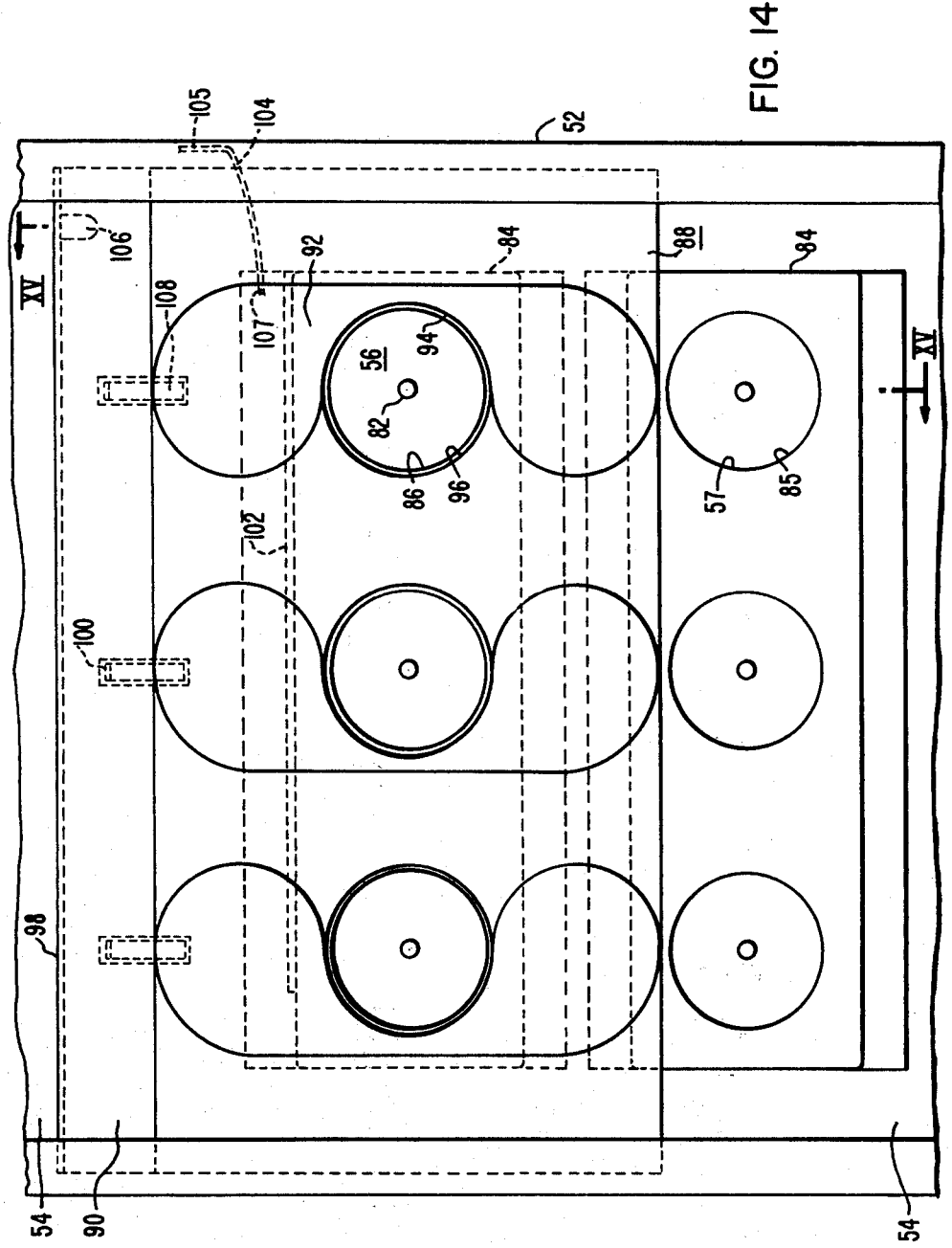

COMPOSITE GROUNDABLE BARRIER FOR SWITCHGEAR AND GROUNDING APPARATUS

CROSS-REFERENCE TO RELATED APPLICATIONS

The subject matter of this invention is related to co-pending application Ser. No. 6,833, now U.S. Pat. No. 4,216,521, entitled "Composite Groundable Barrier For Switchgear" filed Jan. 26, 1979 by the present inventor and assigned to the assignee of the present invention.

BACKGROUND OF THE INVENTION

The subject matter of this invention relates generally to protective shutters for the live stationary terminals of metal clad or metal enclosed switchgear and relates more specifically to disconnectable grounding means for composite insulating-conducting barriers.

Metal clad and metal enclosed switchgear are well known electrical apparatus. Generally, a metal enclosed swithgear apparatus includes a metal cabinet having high voltage stationary electrical terminals in the rear portion thereof to which may be connected the terminals of draw-out or roll-out circuit breaker apparatus. The circuit breaker apparatus is generally self-contained and portable to the extent that it can be completely removed from the cabinet for repair, replacement or the like. Prior to operation, the front of the cabinet is opened, the circuit breaker is rolled into position for engagement with the complementary high-voltage terminals and then the cabinet door is closed. At this point, an appropriate manual or motor driven "levering in" operation is begun. The latter "levering in" operation constitutes the final stage in the joining of the stationary high-voltage contacts of the stationary switchgear cabinet with the complementary contacts of the portable circuit breaker apparatus. This is done within the confines of an enclosed metal cabinet for safety. Furthermore, the cabinet is maintained at electrical ground potential for providing a suitable envelope of protection around the high voltage apparatus and terminations contained therein. It had been found previously in the prior art that it was advantageous to somehow shield the high-voltage terminals of the switchgear cabinet from inadvertent physical contact with either persons or other objects when the portable circuit breaker apparatus has been removed. To accomplish this, interlocking means on the cabinet which are complementary with portions of the portable circuit breaker are constructed and aligned in such a way that as the circuit breaker apparatus is removed from the switchgear cabinet, a protective shutter device is automatically deployed in front of the high voltage terminals. Such apparatus is shown in prior art U.S. Pat. No. 3,213,222, issued Oct. 19, 1965 to J. D. Finley et al. and entitled, "Switchgear Shutter". The latter patent is assigned to the assignee of the present invention. In the aforementioned prior art patent, the shutter essentially comprises sheet metal material. The sheet metal material when in place in front of the aforementioned high-voltage terminals essentially provides a complete zero ground plane between the circuit breaker portion of the switchgear cabinet and the stationary terminals of the high voltage portion. It is easy to see that this provides significant protection for personnel who may find themselves within the circuit breaker portion of the cabinet. It can also be seen by examining the aforementioned prior art patent that the main stationary terminals are offset from the shutter by an insulating spout or bottle which comprises a hollow cylindrical insulator into which elongated complementary terminals of the circuit breaker protrude for eventual interconnection with the stationary terminals at the rear of the spout or bottle. The combination of the lowered shutter in front of the opening in the spout and the enlongated insulating tubular barrel provide significant electrical protection. As the prior art developed and the relative size of circuit breaker apparatus and switchgear cabinets were reduced for more efficient utilization of material and space, the longitudinal distance between the shutter at one end of the spout or bottle and the high voltage contacts at the other end began to diminish to a point where flashover between the contacts and the shutter was possible or where flashover between a stored shutter and a live circuit breaker contact was possible. To offset this, the shutters of the more advanced state of the prior art were made of insulating material such as a polyester material which was not electrically conducting and which essentially solved the problem of flashover. However, at this point in the advanced state of the prior art, a significant problem arose. Namely, the polyester material is suitable for insulating the front of the spouts or bottles, i.e., the circuit breaker portion of the switchgear cabinet, from the high voltage terminals at the ends of the bottles, however, the capacitive effect associated with the polyester material acts in such a way that an electrostatic charge can build up or accumulate on a portion of the insulating material so that inadvertent contact therewith from the circuit breaker portion of the switchgear cabinet can be dangerous. On the other hand, the metal shutters are grounded and provided a zero ground plane as was described previously, but are susceptible to arc-over or flashing as was described previously. In the previously mentioned co-pending cross-related application Ser. No. 6,833, the latter-mentioned problem is solved by utilizing a composite electrically conducting and electrically insulating shutter. The shutter is provided for placement over the ends of the bottles or sprouts of the high voltage stationary terminals of the metal clad switchgear to effectively separate the high voltage compartment of the switchgear from the circuit breaker compartment of the switchgear when the circuit breaker apparatus has been removed. The shutter comprises a significant amount of insulating material which prevents flashover and furthermore comprises judiciously disposed electrically conducting material which provides a suitable electrical ground plane at critical portions of the shutter to provide adequate protection in the vicinity of the bottle openings. Furthermore, the electrically conducting material is grounded only when the shutter is in its protective disposition. The grounding interconnection is removed as the shutter is disposed away from the openings of the spouts for storage, when the circuit breaker terminals are in a position of contact with the high voltage terminals. The ungrounding of the electrically conducting material allows for a relatively small distance of travel in the shutter from its protective position to its stored or non-protective position. Unfortunately, in the prior art suitable means had to be found for effectuating the grounding arrangement. When the grounding strap or grounding bar which is interconnected with the metal clad switchgear is permanently disposed too close to the live electricl parts of the switchgear apparatus, a flashover to the ground bar may occur. On the other hand, if an appropriate grounding mechanism is not provided, the mechanical interconnection at the time when grounding is required becomes a problem. It would be desirous therefore, if grounding apparatus could be found which had the advantage of being disposed close enough to the movable shutter to provide effective grounding at appropriate times but which nevertheless did not cause flashover at a time when grounding was undesirable.

SUMMARY OF THE INVENTION

In accordance with the invention, electrical apparatus, such as but not limited to circuit breaker apparatus, is provided with an appropriate grounding mechanism. The grounding mechanism includes a horizontally disposed polyester lip on the portion of the vertically movable barrier. Horizontally disposed contact members are interconnected with the previously described electrically conducting portions of the barrier so that when the barrier is lowered into place, the previously named contact members make electrical contact with a horizontally disposed electrically conducting grounding bar which traverses a significant portion of the width of the circuit breaker cabinet. A flexible contact is secured at one end thereof to the grounded metal cabinet of the switchgear cabinet. The other end of the flexible contact is disposed vertically between the aforementioned polyester lip on the polyester barrier and the grounding bar so that as the polyester barrier is lowered, the flexible contact is captured by the lip and forced downwardly against the electrically conducting grounding bar. This happens in such a way that the depressed flexible conductor interconnects the grounding bar with the metal clad switchgear cabinet walls at the same time that the contacts which are interconnected with the electrically conducting portions of the barrier make contact with the grounding bar, thus providing a completed ground path between the electrically conducting portions of the barrier, the contacts connected thereto, the grounding bar, the flexible contact, and the grounded switchgear cabinet or support. When the polyester barrier is raised, both sets of contacts are disconnected so that the grounding bar is no longer at ground electrical potential and consequently, the likelihood of flashover is greatly reduced.

BRIEF DESCRIPTION OF THE DRAWINGS

For a better understanding of the invention, reference may be had to the preferred embodiments thereof shown in the accompanying drawings in which:

FIG. 13 shows a top view of a portion of the apparatus shown in FIGS. 11 and 12 partially broken away;

FIG. 14 shows the apparatus of FIG. 11 in a non-protective or barrier raised disposition.

DESCRIPTION OF THE PREFERRED EMBODIMENTS

Figure 1:
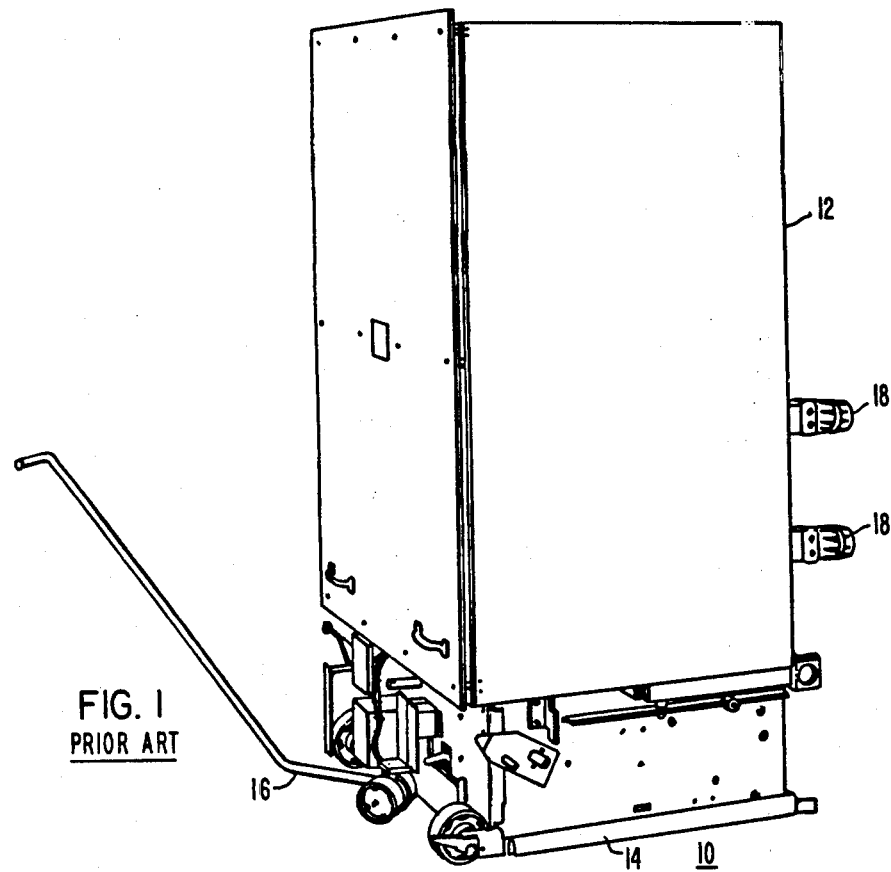
FIG. 1 shows a three-dimensional view of a prior art circuit breaker for use with metal clad switchgear of a type which has a shutter therein.

Referring now to the drawings and to FIGS. 1 through 6 in particular, prior art circuit breaker apparatus of the kind related to the present invention is shown. In particular in FIG. 1, a prior art draw-out circuit breaker 10 is shown. The draw-out circuit breaker 10 includes a circuit breaker section 12 and a trolley section 14. The circuit breaker section 12 includes circuit breaker apparatus, for example, and the trolley portion 14 includes mechanisms, latches, and other apparatus associated with the circuit breaker. There is also provided a handle 16 which is detachably attached to the portable circuit breaker trolley 14 in such a manner that the circuit breaker 10 may be wheeled into and out of a metal clad or a metal enclosed switchgear cabinet. There are shown circuit breaker contacts 18 which are complementary with stationary high voltage contacts (not shown in FIG. 1) in the circuit breaker cabinet.

Figure 2:
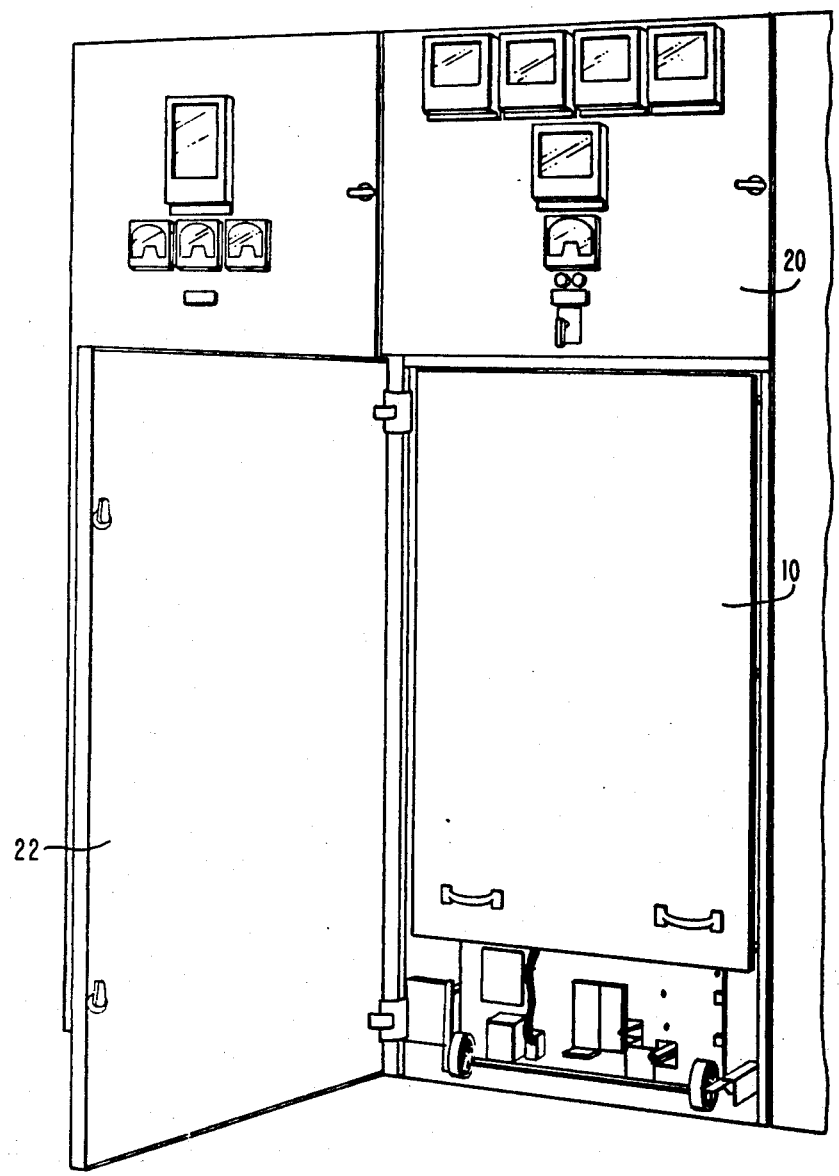
FIG. 2 shows the circuit breaker of FIG. 1 disposed within metal clad switchgear in an operating position.

Referring now to FIG. 2, the portable circuit breaker apparatus 10 of FIG. 1 is shown disposed or positioned in a metal clad circuit breaker cabinet 20. It is to be noted that the removable handle 16 has been taken away. A door 22 on the circuit breaker 20 may be closed at this point providing a complete metal enclosure around the circuit breaker apparatus 10.

Figure 3:
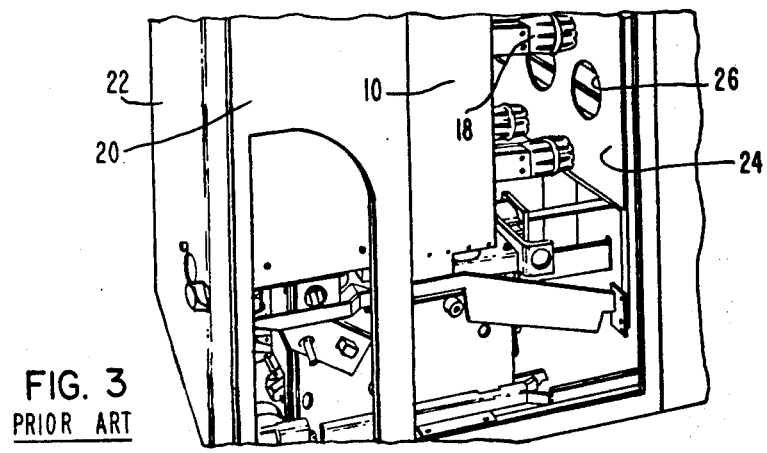
FIG. 3 shows the apparatus of FIGS. 1 and 2 in a position immediately prior to the beginning the levering in operation.
Figure 4:
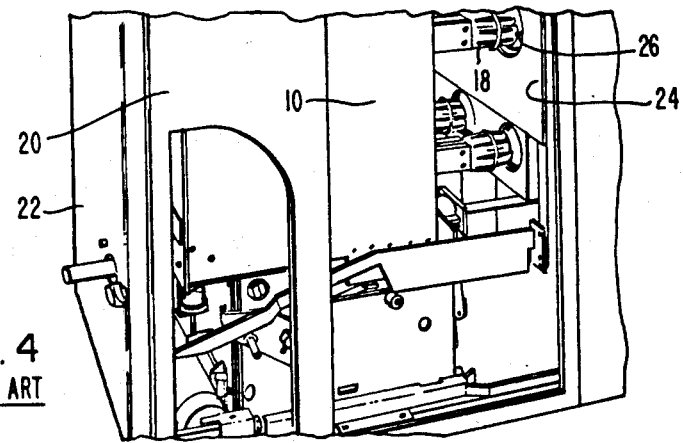
FIG. 4 shows the circuit breaker apparatus of FIG. 3, in an intermediate levering in disposition.
Figure 5:
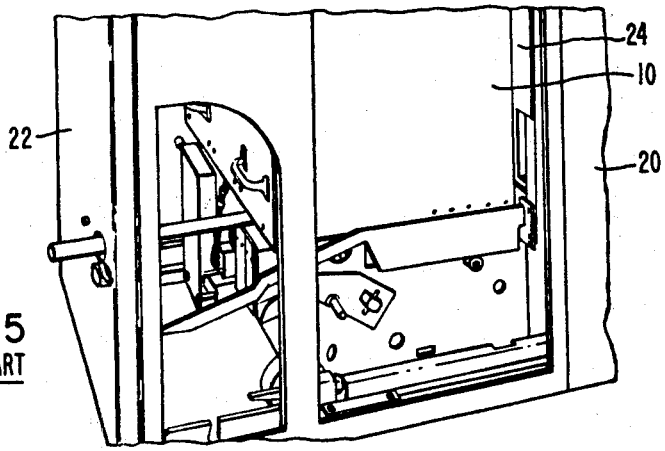
FIG. 5 shows the circuit breaker apparatus of FIGS. 3 and 4, in a completely levered in disposition.

Referring now to FIGS. 3 and 5, the stages of "levering in" of the circuit breaker apparatus 10 of FIGS. 1 and 2 are shown. In FIG. 3, the circuit breaker apparatus 10 is shown disposed in the cabinet 20 in generally the same disposition as shown in FIG. 2, but with the door 22 closed. The contacts 18 are shown in proximity to a glass polyester insulating shutter 24 having openings 26 therein through which the elongated contacts 18 may protrude for eventual interconnection with the high voltage terminals. In some parts of the prior art the shutter 24 may entirely comprise metal or conductive material. It is to be noted in this case that the holes 26 are not aligned with the contacts 18. In FIG. 4, the levering in operation has begun and is in an intermediate state. In this case, appropriate linkages and latches on the portable circuit breaker 10 have been interlinked with complementary members on the cabinet 20 for moving the shutter 24 to a non-protective disposition so that the contacts 18 may protrude through the now-aligned openings 26 for eventual making with the high voltage contacts (not shown) of the cabinet 20. In FIG. 5, the levering in operation has been completed and the circuit breaker apparatus 10 is in its operating disposition within the cabinet 20.

Figure 6:
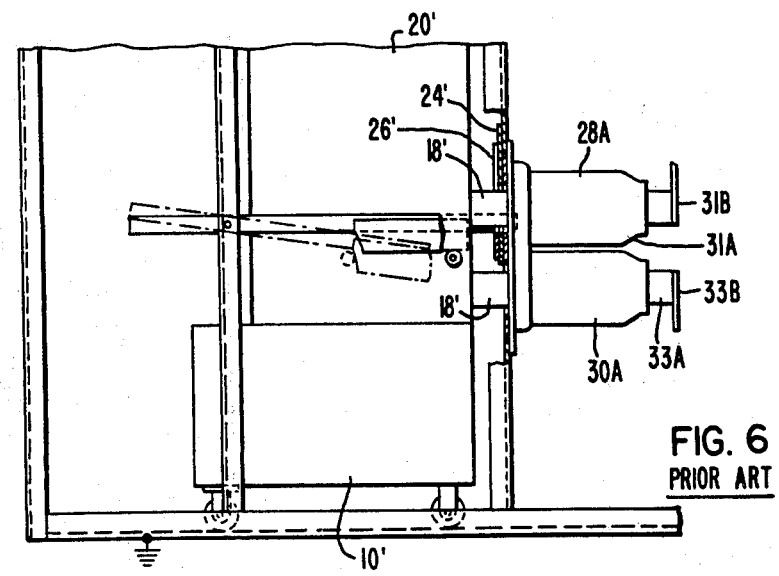
FIG. 6 shows a side view partially broken away and partially in section of circuit breaker apparatus similar to but not necessarily the same as that shown in FIGS. 1 through 5 in which a protective shutter is used.

Referring now to FIG. 6, a side elevation of circuit breaker apparatus similar to but not necessarily exactly the same as that shown in FIGS. 1 through 5 is depicted. In this case, terminals 18' are shown protruding through openings 26' in a raised shutter 24' into a high voltage terminal assembly 28A on the top and 30A on the bottom. The high voltage terminal assembly 28a includes an elongated, cylindrical, hollow, bottle or spout 31A at the rear of which is disposed a high voltage terminal 31B. In a like manner, the high voltage terminal assembly 30A includes an elongated electrically-insulating spout 33A at the rear of which is the high voltage terminal 33B. The circuit breaker apparatus 10' is shown completely levered into the cabinet 20' in the depiction of FIG. 6.

Figure 7:
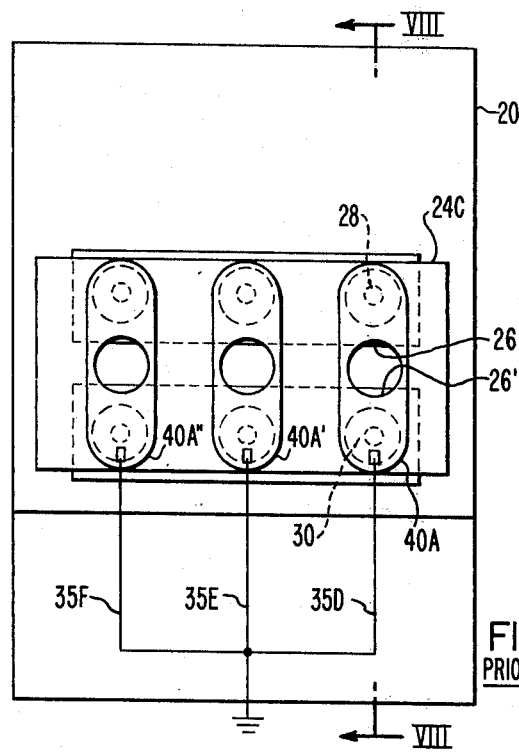
FIG. 7 shows a front view of a portion of the rear of the circuit breaker compartment of switchgear apparatus such as shown in the prior art in FIGS. 1 through 6 in which a prior art composite shutter arrangement and grounding connection is shown in the lowered or protective disposition.
Figure 8:
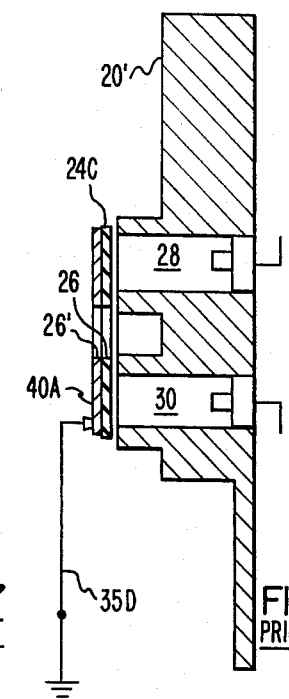
FIG. 8 shows a side view, partially cut away and partially in section of the apparatus of FIG. 7.

Referring now to FIGS. 7 and 8, still another prior art arrangement such as disclosed and claimed in co-pending application Ser. No. 006,833 is shown in which an insulating shield 24C has disposed thereon three vertically-aligned electrically conducting plates 40A, 40A' and 40A" for each set of terminal assemblies 28 and 30. It will be noted that each of the conductive plates 40A, 40A' and 40A" overlap two terminal assemblies 28 and 30 vertically. It will be noted that in each of the conductive assemblies 40A, 40A' and 40A", there is disposed a hole or opening 26' which aligns with a similar hole or opening 26 in the insulating material of the shield 24C. When the shield 24C is in the raised or non-shielding position, the two aligned holes 26' and 26 become aligned with the uppermost terminal assembly 28 for insertion therethrough of an elongated circuit breaker contact 18 (not shown) for interconnection with an appropriate high voltage cabinet terminal assembly (not shown). Ground rods or means 35D, 35E and 35F interconnect with conductive plates 40A, 40A' and 40A" respectively when the shield is in the protective disposition shown in FIGS. 7 and 8.

Figure 9:
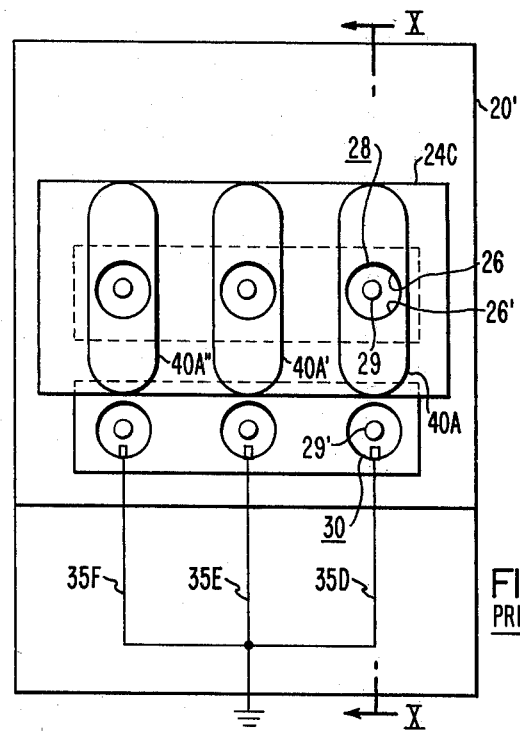
FIG. 9 shows the apparatus of FIG. 7 in a non-protective or barrier raised disposition.
Figure 10:
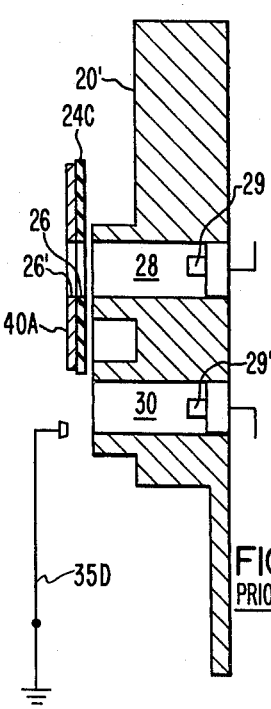
FIG. 10 shows a side view, partially cut away and partially in section of the apparatus of FIG. 9.

Referring now to FIGS. 9 and 10, the apparatus of FIGS. 7 and 8 is shown in the non-protective or barrier raised disposition. In this case, the composite barrier 24C has been raised such that the holes 26 and 26' in the barrier 24C and the electrically conducting plate 40A for example, aligns axially with the opening of the assembly 28 so that an electrically conducting contact member of movable circuit breaker apparatus may be moved from left to right as viewed in FIG. 10 for example into the hole to mate with the appropriate stub 29 on the output terminal of the switchgear apparatus. It will be noted that the lifting of the barrier 24C to the disposition shown in FIG. 10, for example, causes the lower portion of the barrier to vertically clear or uncover the opening in the assembly 30 of the lower contact bottle shown in the Figure so that the lower contact of the movable circuit breaker apparatus may make appropriate interconnection with the stub 29'. Also, the action of raising the barrier 24C disconnects the electrically conducting plates 40A, 40A' and 40A" from the grounding mechanism 35D.

Figure 11:
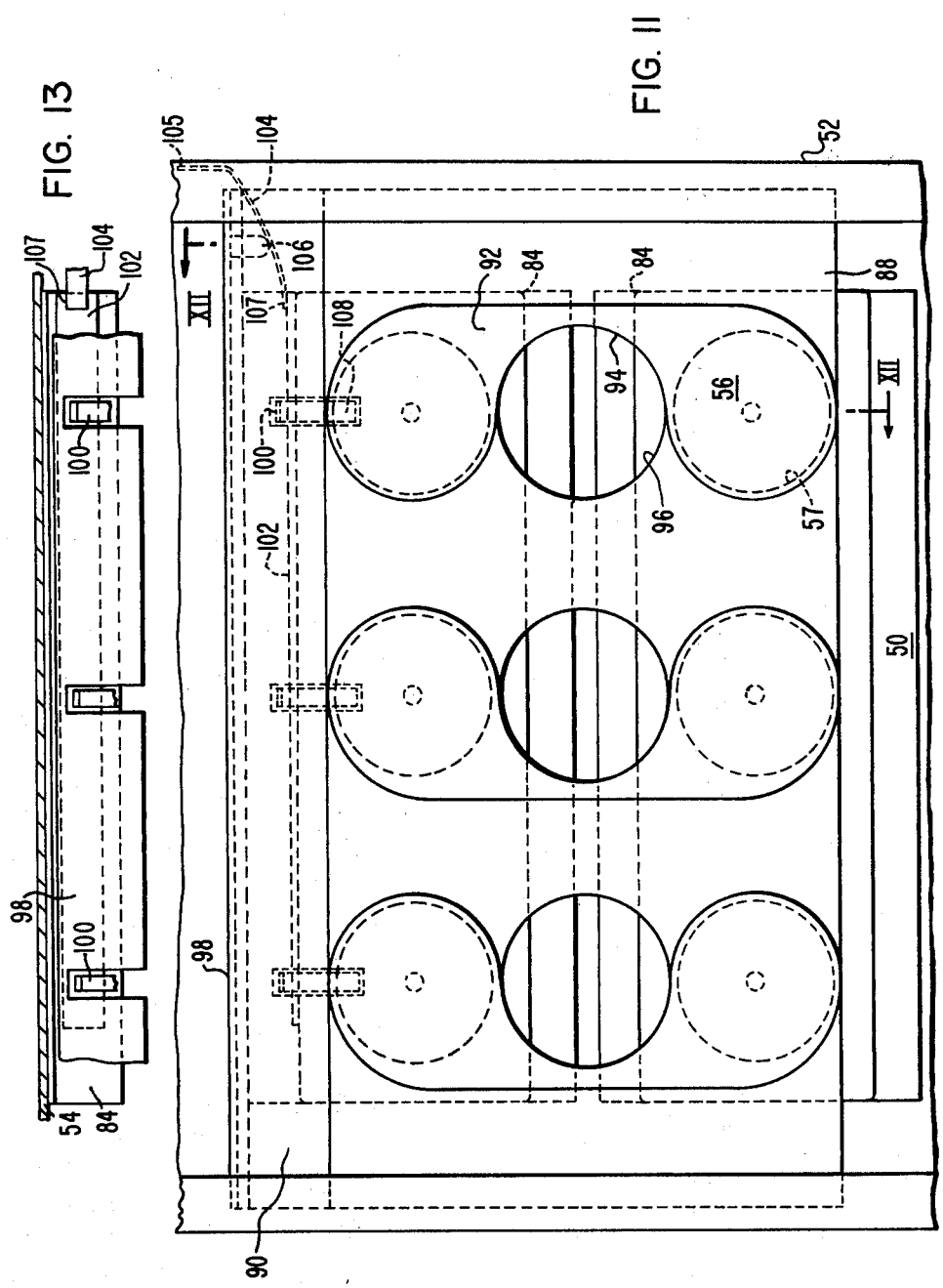
FIG. 11 shows a view of a portion of the rear of the circuit breaker compartment of switchgear apparatus using a novel grounding arrangement.
Figure 12:
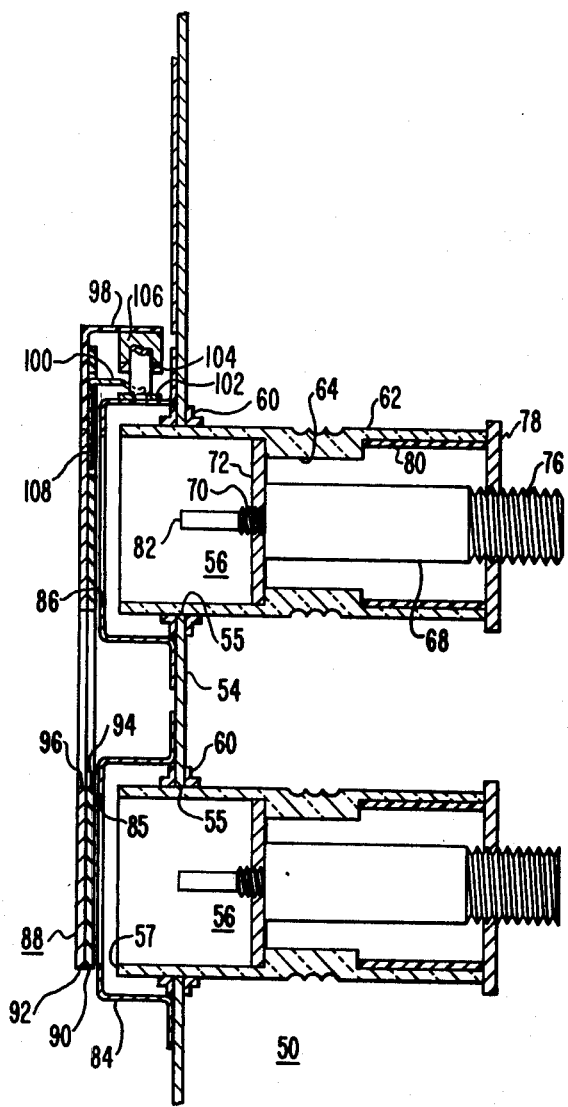
FIG. 12 shows a side elevation of the apparatus of FIG. 11 partially broken away.
Figure 15:
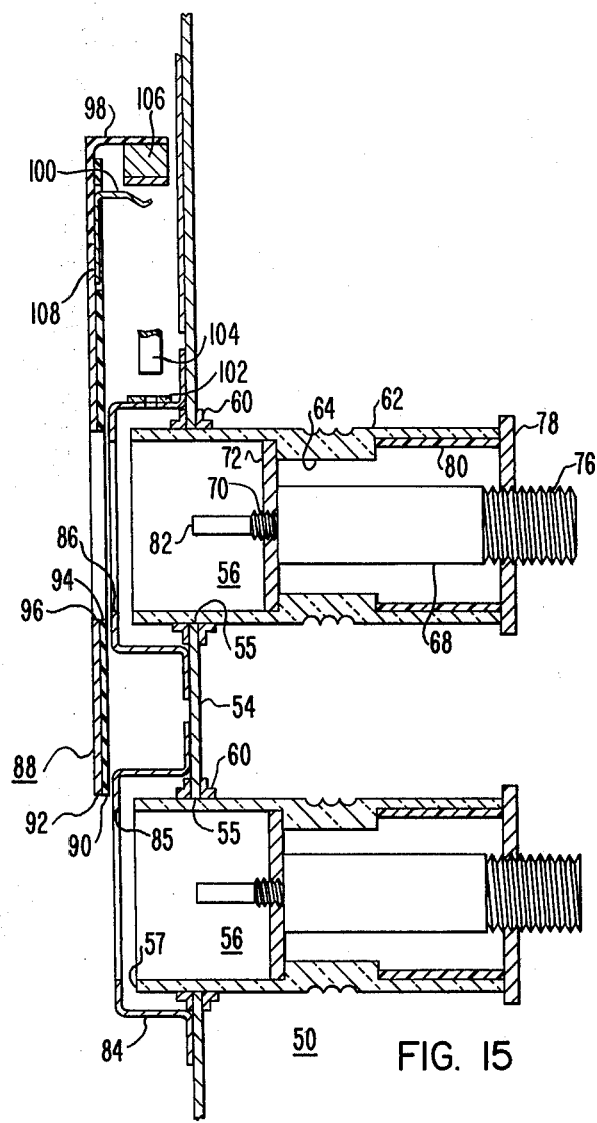
FIG. 15 shows the apparatus as depicted in FIG. 12 in a non-protective or barrier raised disposition.

Referring now to FIG. 11 through 15, apparatus embodying the teachings of the present invention is shown. In particular, FIGS. 11 and 12 show the shutter-bottle arrangement for metal clad switchgear in the shutter protective or lowered disposition whereas FIGS. 14 and 14 show the apparatus in the shutter non-protective or raised position. In FIGS. 11 through 13 there is shown electrically conducting vertical support brackets 52 upon which portions of the switchgear apparatus such as the electrically conducting cell divider plate 54 is disposed. The electrically conducting divider plate 54 separates the circuit breaker compartment on the left as viewed in FIG. 12 from the high voltage compartment on the right as viewed in FIG. 12. The plate 54 may have cut or otherwise formed therein circular openings through which protrude the front end of contact bottle apparatus 56. In the embodiment of the invention shown in FIGS. 11 and 12 the bottles are arranged in rows of three, one above the other, typical of a three phase electrical system. As best seen by viewing FIG. 12, one set of complementary bottles 56 for one phase is shown. The bottles 56 may comprise cylindrical casings 62 which may be made of porcelain or other suitable electrically insulating material which has the property of bearing mechanical loads where necessary. Longitudinally disposed on the inner portion of the bottle 62 is an abutment 64. An electrically conducting cylindrical member 68 having a relatively large threaded portion 76 on the right thereof as viewed in FIG. 12 and a relatively small, partially threaded portion 70 on the left thereof is disposed along the axis of the bottle 62 concentrically with respect to the diameter of the bottle 62. Extending outward from the threaded portion 70 is a terminal portion 82 with which the flexible fingers of a movable circuit breaker contact mates for providing circuit interrupter controllable continuity between the upper bottle 56 and the lower bottle 56 as shown in FIG. 12. The stud 68 is held in position radially in the center of the bottle 56 by way of internally threaded flange 72 on the left as viewed in FIG. 12 and internally threaded flange 78 on the right as shown in FIG. 12. The flange 78 abuts against a cylindrical insulating shell portion 80, the other end of which abuts against the previously described abutment portion 64 of the shell 62. The flange member 72 axially abuts against abutment member 64 from the other side. The members 72 and 78 are engaged with the complementary threaded portions 70 and 76, respectively, to secure the stud member 68 in the radially centered position depicted in FIG. 12. The bottle members 56 are securely disposed in the holes or openings 55 in the vertical member 54 by way of circular flange members 60 as is best shown in FIG. 12. As viewed in FIG. 12 there is disposed against the left portion of the electrically conducting compartment dividing member 54, "top-hat" protective members 84 which protrude outwardly from the vertically rising member 54 to provide protection for the front portion 57 of the bottles 56. The top hat members have circular openings 85 disposed therein which are axially aligned with the axis of the bottle members 56. There is disposed to the left of the "top-hat" or protective members 84 as shown in FIG. 12, a composite barrier 88 having a predominantly electrically insulating or polyester portion 90 on the right thereof as viewed in FIG. 12 and judiciously and appropriately disposed islands of electrically conducting material 92 on the left portion thereof as viewed in FIG. 12. There are circular holes 94 in the vertically center portion of the polyester or non-electrically conductive sheet 90 and aligned reduced portions 96 in the electrically conducting member 92 so that a cylindrical hole is formed through the entire shutter member 88 through which the flexible contact fingers of a circuit breaker may protrude when the shutter is in the raised position as is best shown in FIGS. 14 and 15. In the arrangement shown in FIGS. 11 and 12, the shutter is in its lowered or protective disposition so that the polyester or non-electrically conductive material 90 shields the front of both bottle members 56 from entrance from the left as viewed in FIG. 12. The electrically conductive members 92 also are disposed to shield the opening of the bottles 56 in the disposition shown in FIG. 12 so that a substantially ground plane is formed between the high voltage terminals 82 of the bottles 56 and apparatus to the left of the shutter in the circuit breaker compartment as viewed in FIG. 12. In order to provide the grounding for conducting portions 92 as previously described, grounding contacts 100 may protrude through portions on the polyester shutter 90 to make contact with the islands of conducting material 92 at 108. Furthermore, a polyester L-shaped bracket member 98 as best shown in FIG. 12 is disposed horizontally along the top of the shutter 88. The L-shaped bracket member, also shown in FIG. 13, has disposed thereupon and protruding downwardly therefrom a tripper stub 106. Furthermore, there is disposed along the upper horizontal edge of the upper "top-hat" portion 84 a grounding bar 102 which is securely fastened to the "top-hat" portion 84 by appropriate fasteners. As best viewed in FIG. 11, there is provided against a portion of the support or metal clad switchgear cabinet at 105 a flexible cantilevered switch beam 104. The flexible cantilevered switch beam 104, as is best seen by viewing FIGS. 14 and 15, is disposed away from the ground bar 102 when the shutter 88 is in the raised disposition. However, as the shutter 88 is lowered, as is best shown in FIGS. 11 and 12, the tripper member 106 makes physical contact with the flexible grounding contact beam member 104 thus depressing it downwardly as shown in FIGS. 11 and 12 until firm, low-resistance electrical contact is made between the member 104 and the grounding bar 102 at 107. The movement of the shutter 88 downwardly also brings the contact members 100 into a disposition of electrical continuity with the grounding bar 102 so that the substantially ground electrical potential of the metal clad cabinet is transmitted by way of the switch beam 104, the grounding bar 102, and the contact members 100 to the conducting ground plate 92 shown in FIGS. 11 and 12. As the shutter 88 is raised, openings 96 and 94 therein eventually align with the frontal openings in the central portion of the upper bottle 56 so that circuit breaker terminals disposed on a movable circuit breaker or interrupter, not shown, to the left in the circuit breaker compartment of FIG. 12 may be moved to the right through the openings 96 and 94 in the shutter 88 and thence through the leftmost or frontal opening of the bottle 56 to make electrical contact with high voltage stud 82. Connected to the threadable terminals 76 on the rightmost portion of the studs 68 of FIG. 12 may be high voltage bus bars or the like (not shown) which may be interconnected with a high voltage electrical system served by the equipment of the cabinet 50. When the shutter 88 is in the raised position as shown in FIGS. 14 and 15, the electrical continuity between the switch beam 104 and the grounding bar 102 is broken and the electrical continuity between the grounding bar 102 and the flexible contacts 100 is also broken. This leaves the islands of protective electrically conductive material 92 at non-ground potential or floating potential so that electrical flashover between the stud 82 and the conductive portions 92, for example, is prevented or deterred when the circuit breaker, not shown, is in the engaged or alive position.

It is to be understood with respect to the embodiments of this invention that the invention is not limited merely to circuit breaker use, although that is the preferred embodiment thereof. It is also to be understood that the arrangement of the conductive material 92 is not limiting nor is the type of conductive and insulating materials limiting except to the extent that they must substantially be conductive or substantially non-conductive as the case may be. The arrangement of the bottles is non-limiting and the arrangement of the vertical divider wall portion is also non-limiting. It is also to be understood that the three phase arrangement depicted best in FIG. 11 is non-limiting and the apparatus may be used with other phase arrangements, with other dispositions of the bottles, and with DC arrangements if desired.

The apparatus taught with respect to the embodiments of this invention have many advantages. One advantage lies in the fact that the shutter member may in its lowered or protective disposition have substantial regions of the protective ground planes thereon interposed between the live terminals of the bottles and the circuit breaker compartment of metal clad switchgear apparatus. Another advantage lies in the fact that when the shutter is raised or in its non-protective disposition so that the circuit breaker contacts may be inserted into the bottles for energizing the circuit breaker, the electrically conductive portions on the shutter are rendered non-grounded or in floating potential state so that flashover thereto may not easily occur.

If desired, the various embodiments of the invention 24A, 24B and 24C may include non-magnetic conductive material non-magnetic for further enhancing the electrical characteristics of the shutter.

What I claim as my invention is:

1. Electrical apparatus, comprising:
   (a) electrically grounded support means;
   (b) a stationary electrical contact means disposed on said support means in a disposition to be contacted only from a point within a limited three-dimensional angular range;
   (c) movable electrical contact means for being selectively disposed in a disposition of engagement with said stationary contact means or not, said engagement coming from a point within said range;
   (d) movable composite barrier means movably disposed upon said support means for being actuated to a first position to insulate said stationary contact means from any point within said range when said movable contact means is not in a disposition of engagement therewith, and for being actuated to a second position to allow said engagement of said stationary contact means with said movable contact means, said composite barrier means comprising electrically insulating material for that portion thereof which is closest to said stationary contact means when said barrier means is in said first position and electrically conducting material which is spaced from said stationary contact means by said insulating material, said electrically conducting material having a contact thereon for being grounded when said barrier means is in said first position to thus interpose the electrical potential of ground between said stationary contact means and any point in said range, said electrically conducting material being ungrounded when said barrier means is in said second position to thus reduce the tendency to interact electrically with said engaged stationary contact means and said movable contact means;

(e) actuating means for moving said barrier means; and (f) grounding means including an electrical conductor and an actuating-means-actuated contact means for connecting said support means to said conductor at a time which is generally concurrent with said contact on said barrier means being connected to said conductor for thus grounding said conducting material when said barrier means is in said first position, said latter two separate connections both being disconnected when said barrier means is in said second position.

2. Switchgear apparatus, comprising:
(a) a grounded metal enclosure;
(b) a stationary electrical contact disposed within said enclosure for being contacted within said enclosure from a point within a limited three-dimensional angular range;
(c) movable electrical apparatus including contact means for being selectively disposed in a disposition of engagement with said stationary contact or not, said engagement coming from a point within said range;
(d) movable composite barrier means movably disposed within said enclosure means for being actuated to a first position to insulate said stationary contact from any point within said range when said contact means of said movable electrical apparatus is not in a disposition of engagement with said stationary contact, and for being actuated to a second position to allow said engagement of said stationary contact with said contact means of said movable electrical apparatus, said composite means comprising electrically insulating material for that portion thereof which is closest to said stationary contact when said barrier means is in said first position and electrically conducting material which is spaced from said stationary contact by said insulating material, said electrically conducting material having a contact thereon for being grounded when said barrier is in said first position to thus interpose the electrical potential of ground between said stationary contact and any point in said range, said electrically conducting material being ungrounded when said barrier means is in said second position to thus reduce the tendency to interact electrically with said engaged stationary contact and said electrical apparatus;
(e) actuating means for moving said barrier means; and
(f) grounding means including an electrical conductor and an actuating-means-actuated contact means for connecting said support means to said grounding means at a time which is concurrent with said contact on said barrier means being connected to said grounding means for grounding said conducting material when said barrier means is in said first position, said latter two separate connections both being disconnected when said barrier means is in said second position.

3. The combination as claimed in claim 2 wherein said movable electrical apparatus comprises a circuit breaker.

4. The combination as claimed in claim 2 wherein said barrier means comprises a shutter which moves in a generally vertical direction between said first and said second positions.

5. Switchgear apparatus, comprising:
(a) a grounded metal enclosure;
(b) a plurality of horizontally aligned stationary electrical contacts disposed within said enclosure each of which is capable of being contacted within said enclosure from points within a limited three-dimensional angular range;
(c) movable electrical apparatus including a plurality of contacts means, each of which is capable of being selectively disposed in a disposition of engagement with said stationary contact or not, said engagement coming from points within said range;
(d) movable composite barrier means movably disposed within said enclosure for being actuated to a first position to insulate said stationary contacts from any point within said range when said contact means of said movable electrical apparatus are not in a disposition of engagement with said stationary contacts, and for being actuated to a second position to allow said engagement of said stationary contacts with said contact means of said movable electrical apparatus, said composite means comprising electrically insulating material for that portion thereof which is closest to said stationary contacts when said barrier means is in said first position and electrically conducting material which is spaced from said stationary contact by said insulating material, said electrically conducting material having a contact thereon for being grounded when said barrier means is in said first position to thus interpose the electrical potential of ground between said stationary contacts and any point in said range, said electrically conducting material being ungrounded when said barrier means is in said second position to thus reduce the tendency to interact electrically with said engaged stationary contacts and said electrical apparatus;
(e) actuating means for moving said barrier means; and
(f) grounding means including an electrical conductor and an actuating-means-actuated contact means for connecting said support means to said grounding means at a time which is concurrent with said contact on said barrier means being connected to said grounding means for grounding said conducting material when said barrier means is in said first position, said latter two separate connections both being disconnected when said barrier means is in said second position.

6. The combination as claimed in claim 5 wherein said electrical apparatus comprises a circuit breaker.

7. The combination as claimed in claim 5 wherein said barrier means comprises a shutter which moves in a generally vertical direction between a first shutter position and a second shutter position.

8. The combination as claimed in claim 7 wherein said electrically conducting material comprises a rectangular which completely overlaps all of said horizontally aligned stationary electrical contacts when said barrier means is in said first position.

9. The combination as claimed in claim 8 wherein said conducting material is non-magnetic.

10. The combination as claimed in claim 7 wherein said electrically conducting material comprises separate plates, each of which completely overlaps one of such horizontally aligned stationary electrical contacts when said barrier means is in said first position.

11. The combination as claimed in claim 10 wherein said conducting material is non-magnetic.

12. The combination as claimed in claim 7 wherein a second plurality of horizontally aligned stationary contacts is disposed beneath the first plurality of horizontally aligned stationary contacts, said electrically conducting material comprising separate plates, each of which completely overlaps one of said horizontally aligned stationary electrical contacts and one of said second plurality of horizontally aligned stationary contacts.

13. Electrical apparatus, comprising:
(a) support means electrically maintained at generally ground electrical potential;
(b) first contact means supported by said support means but electrically insulated therefrom;
(c) second electrical contact means disposable in either of two dispositions relative to said first contact means, the first of said two dispositions being one of electrical continuity between said first and said second contact means, the second of said two dispositions being one of non-electrical continuity between said first and said second contact means;
(d) electrically insulating barrier mean insertable to a disposition between said first contact means and said second contact means when both said later contact means are in said second disposition, said barrier means having electrical conductor means thereon for providing an electrical ground potential between said first and second contact means when said first and second contact means are in said second disposition; and
(e) grounding means actuable by the movement of said barrier means towards said barrier-means-disposition between said first and second contact means for making separate electrical contact with said electrical conductor means on said barrier means and a conductor on said support means, said grounding means being actuable by movement of said barrier means from said barrier-means-disposition between said first and said second contact means for breaking said separate electrical contact between said electrical conductor means on said barrier means and said conductor on said support means.

14. Electrical apparatus, comprising:
(a) support means electrically maintained at generally ground electrical potential;
(b) first electrical contact means supported by said support means;
(c) second electrical contact means disposable in either of two dispositions relative to said first contact means, the first of said two dispositions being one of electrical continuity between said first and said second contact means, the second of said two dispositions being one of non-electrical continuity between said first and said second contact means;
(d) electrically insulating barrier means insertable to a disposition between said first contact means and said second contact means when both said later contact means are in said second disposition, said barrier means having electrical conductor means thereon for providing an electrical ground potential between said first and second contact means when said first and second contact means are in said second disposition; and
(e) grounding means actuable by the movement of said barrier means towards said barrier-means-disposition between said first and second contact means for making separate electrical contact with said electrical conductor means on said barrier means and a conductor on said support means, said grounding means being actuable by movement of said barrier means from said barrier-means-disposition between said first and said second contact means for breaking said separate electrical contact between said electrical conductor means on said barrier means and said conductor on said support means.

15. Electrical switchgear apparatus, comprising:
(a) support means electrically maintained at generally ground electrical potential;
(b) generally fixed contact means supported by said support means but electrically insulated therefrom;
(c) movable circuit interrupter apparatus with circuit interrupter electrical contact means disposable in either of two dispositions relative to said fixed contact means, the first of said two dispositions being one of electrical continuity between said fixed contact means and said circuit interrupter contact means, the second of said two dispositions being one of non-electrical continuity between said fixed contact means and said circuit interrupter contact means;
(d) electrically insulating barrier means insertable to a disposition between said fixed contact means and said circuit interrupter contact means when both said later contact means are in said second disposition, said barrier means having electrical conductor means thereon for providing an electrical ground potential between said fixed contact means and circuit interrupter contact means when said fixed and circuit interrupter contact means are in said second disposition; and
(e) grounding means actuable by the movement of said barrier means towards said barrier-means-disposition between said fixed contact means and said circuit interrupter contact means for making separate electrical contact with said electrical conductor means on said barrier means and a conductor on said support means, said grounding means being actuable by movement of said barrier means from said barrier-means-disposition between said fixed contact means and said circuit interrupter contact means for breaking said separate electrical contact between said electrical conductor means on said barrier means and said conductor on said support means.

16. Electrical switchgear apparatus, comprising:
(a) support means electrically maintained at generally ground electrical potential;
(b) generally fixed contact means supported by said support means;
(c) movable circuit interrupter apparatus with circuit interrupter electrical contact means disposable in either of two dispositions relative to said fixed contact means, the first of said two dispositions being one of electrical continuity between said fixed contact means and said circuit interrupter contact means, the second of said two dispositions being one of non-electrical continuity between said fixed contact means and said circuit interrupter contact means;

(d) electrically insulating barrier means insertable to a disposition between said fixed contact means and said circuit interrupter contact means when both said later contact means are in said second disposition, said barrier means having electrical conductor means thereon for providing an electrical ground potential between said fixed contact means and circuit interrupter contact means when said fixed and circuit interrupter contact means are in said second disposition; and (e) grounding means actuable by the movement of said barrier means towards said barrier-means-disposition between said fixed contact means and said circuit interrupter contact means for making separate electrical contact with said electrical conductor means on said barrier means and a conductor on said support means, said grounding means being actuable by movement of said barrier means from said barrier-means-disposition between said fixed contact means and said circuit interrupter contact means for breaking said separate electrical contact between said electrical conductor means on said barrier means and said conductor on said support means.

* * * * *